(12) United States Patent
Ciyanoglu et al.

(10) Patent No.: US 9,803,730 B1
(45) Date of Patent: Oct. 31, 2017

(54) HOME APPLIANCE DEVICE

(71) Applicant: BSH HAUSGERAETE GMBH, Munich (DE)

(72) Inventors: Mehmet Ciyanoglu, Istanbul (TR); Aydin Sahin, Istanbul (TR); Tanzer Yildizgoecer, Tekirdag (TR); Cahit Oender, Izmir (TR)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 15/357,416

(22) Filed: Nov. 21, 2016

(51) Int. Cl.
| | |
|---|---|
| *A47B 91/02* | (2006.01) |
| *F16H 19/02* | (2006.01) |
| *F16H 57/039* | (2012.01) |
| *F25D 23/06* | (2006.01) |
| *F25D 25/02* | (2006.01) |
| *F16M 7/00* | (2006.01) |

(52) U.S. Cl.
CPC ........... *F16H 19/02* (2013.01); *A47B 91/022* (2013.01); *F16H 57/039* (2013.01); *F25D 23/062* (2013.01); *F25D 25/02* (2013.01); *F16M 7/00* (2013.01); *F25D 2323/0011* (2013.01)

(58) Field of Classification Search
CPC ........ F25D 23/00; F25D 23/062; F25D 25/02; F16H 19/02; F16H 57/039; A47B 91/02; A47B 91/022
USPC ...... 312/351.1, 351.3, 401; 248/188.2, 188.4
See application file for complete search history.

(56) References Cited

U.S. PATENT DOCUMENTS

| | | | | |
|---|---|---|---|---|
| 1,417,639 | A | * | 5/1922 | Sterner ............... A47B 91/028 248/188.4 |
| 1,632,383 | A | * | 6/1927 | Seiden ................ A47B 91/028 248/188.4 |
| 4,991,805 | A | * | 2/1991 | Solak ...................... F16M 7/00 248/188.4 |
| 8,220,760 | B2 | * | 7/2012 | Fetzer ................. A47B 91/028 248/188.2 |
| 8,695,933 | B2 | * | 4/2014 | Gennaretti .......... A47L 15/4253 248/188.2 |
| 2003/0136887 | A1 | * | 7/2003 | Gabriel ............... A47L 15/4253 248/188.2 |
| 2004/0178305 | A1 | * | 9/2004 | Avendano ............... E05D 11/00 248/188.2 |
| 2005/0247834 | A1 | * | 11/2005 | Thuelig ............... A47L 15/4253 248/188.4 |

(Continued)

FOREIGN PATENT DOCUMENTS

| | | | |
|---|---|---|---|
| EP | 1895040 | * | 3/2008 |
| WO | WO 2004/107914 | * | 12/2004 |

(Continued)

*Primary Examiner* — James O Hansen
(74) *Attorney, Agent, or Firm* — Laurence A. Greenberg; Werner H. Stemer; Ralph E. Locher

(57) ABSTRACT

For the purpose of providing a home appliance device with improved characteristics regarding a simple construction a home appliance device, in particular a home chiller appliance device, is proposed. The device includes at least one first gearing element that is rotatable around a first rotation axis; at least one second gearing element that is rotatable around a second rotation axis which is perpendicular to the first rotation axis; and at least one housing unit at least mostly covering the first gearing element and having at least one housing element that is latched with the first gearing element.

20 Claims, 3 Drawing Sheets

(56) References Cited

U.S. PATENT DOCUMENTS

| | | | | |
|---|---|---|---|---|
| 2008/0168855 A1* | 7/2008 | Giefer | ............... | A47B 91/024 74/412 R |
| 2014/0132141 A1* | 5/2014 | Sun | ................. | E05D 7/0027 312/404 |
| 2016/0081474 A1* | 3/2016 | Basesme | ............ | A47L 15/4253 248/188.4 |

FOREIGN PATENT DOCUMENTS

| WO | WO 2011/080230 | * | 7/2011 |
|---|---|---|---|
| WO | 2015078511 A1 | | 6/2015 |
| WO | WO 2016/070890 | * | 5/2016 |

\* cited by examiner

HOME APPLIANCE DEVICE

BACKGROUND OF THE INVENTION

The invention relates to a home appliance device, in particular a home chiller appliance device and to a method for assembly of a home appliance device.

From the international patent application WO 2015/078511 A1, a home appliance device is known comprising one first gearing element that is rotatable around a first rotation axis. One second gearing element is rotatable around a second rotation axis which is perpendicular to the first rotation axis. The first gearing element and the second gearing element are inserted in a housing unit that is embodied as one single element. The home appliance device is configured for adjusting a height of a home appliance.

SUMMARY OF THE INVENTION

An objective of the invention is, in particular, to provide a home appliance device with improved characteristics regarding a simple construction. This objective is achieved, according to the invention, as claimed, while further implementations and further developments of the invention may be gathered from the dependent claims.

A home appliance device, in particular a home chiller appliance device, is proposed, which is in particular configured for adjusting a height of a home appliance, comprising: at least one first gearing element that is rotatable around a first rotation axis; at least one second gearing element that is rotatable around a second rotation axis which is perpendicular to the first rotation axis; and at least one housing unit at least mostly covering the first gearing element and comprising at least one housing element that is latched with the first gearing element.

By a "home appliance device" is in particular to be understood at least a portion, preferably a sub-assembly group, of a home appliance. The home appliance is in particular provided for storing and preferably tempering victuals such as beverages, meat, fish, vegetables, fruits, milk and/or dairy products in at least one operating state, advantageously for the purpose of enhancing a storage time of the stored victuals. For example, the home appliance is embodied as a home chiller appliance, which is in at least one operating state configured for cooling victuals. The home chiller appliance could in particular be embodied as a climate cabinet, an ice-box, a refrigerator, a freezer, a refrigerator-freezer combination and/or a wine cooler. However, the home appliance could also be embodied as a home appliance for warming up and in particular for cooking victuals, e.g. an oven and/or a steamer and/or a microwave. Alternatively the home appliance could also be embodied as a home appliance for cleaning, e.g. a washing machine and/or a dryer and/or dishwasher. The home appliance may in particular comprise at least two, in particular at least three and preferably at least four home appliance devices.

By a "gearing element" is in particular to be understood an element transferring and/or altering at least one kinetic momentum in at least one operating state. The kinetic momentum may in particular be a force and/or a momentum of force. The gearing element may in particular have an at least substantially cylindrical shape and may in particular have at least one toothing at its outer surface. In particular, the gearing element could be part of a worm gear and/or a spur gearing and/or a helical gear. In at least one operating state the first gearing element and the second gearing element mesh with one another. The gearing element may in particular be made at least mostly of metal and preferably of a brass alloy. In this context, "perpendicular" is to mean at least substantially perpendicular and/or perpendicular in the technical sense, meaning in particular that rounding errors and/or manufacturing tolerances are considered. In this context, "at least substantially perpendicular" is in particular to be understood as an orientation of a direction with respect to a reference direction, in particular in a plane, wherein the direction and the reference direction include an angle of 90°, the orientation in particular having a deviation of less than 15°, advantageously of less than 10° and particularly advantageously of less than 2°.

The term "at least mostly" with reference to an object is in particular to mean by more than 50% or by more than 65% or by more than 80% or by more than 95% of the object, in particular of a surface area and/or of a volume and/or of a mass of the object. The first gearing element and the housing element may be connected to one another by means of a manually detachable connection. By the wording that a first object is "latched" with a second object and/or the wording that a first object and a second object are "latched" with each other is in particular to be understood that at least one part of one of the objects is deflected in at least one assembly procedure and afterwards engages behind at least one further part of the other one of the objects.

In this context, "configured" is in particular to mean specifically programmed, designed and/or equipped. By an object being configured for a certain function is in particular to be understood that the object implements and/or fulfills said certain function in at least one application state and/or operating state.

By means of the invention, in particular a simple construction of the home appliance device can be achieved. It is in particular possible to assemble and/or disassemble the first gearing element and the housing element in a simple and/or fast way, whereby low manufacturing costs can be achieved. This allows general usage for all similar implementations of appliances. Additionally a solution for a new concept design can be provided. Moreover, delicate electronical devices can in particular be protected from impacts. In particular, a mechanical lock for plug-in electronical devices can be provided. Problems for insolation air leakage and wiring harness damages can in particular be eliminated. In particular an easy height adjustment and/or an easy serviceability can be provided. A volume can in particular be kept small.

For example, the housing element could at least mostly encompass the first gearing element only. Also the housing element may at least mostly encompasses the first gearing element and the second gearing element. As a result of this, the first gearing element and the second gearing element can in particular be located safely and/or protected, thus prolonging a life span of the first gearing element and the second gearing element.

In a further implementation of the invention, which can be considered on its own or in combination with other aspects of the invention, a home appliance device, in particular a home chiller appliance device, is proposed, comprising: at least one first gearing element that is rotatable around a first rotation axis; at least one second gearing element that is rotatable around a second rotation axis which is perpendicular to the first rotation axis; and at least one housing unit at least partly covering the first gearing element and comprising at least one housing element, the first gearing element fixing the second gearing element in position. The first gearing element in particular may prevent a translational movement of the second gearing element in at least one direction. The first gearing element may reduce the degree of freedom for a translational movement of the second gearing element at least in one direction. On account of this, in particular a fixing device for fixing the second gearing element in position can be dispensed with, whereby low costs can be achieved.

Additionally, it is proposed that the second gearing element may at least be mostly arranged between the first gearing element and at least one section of the housing element. The second gearing element may in particular be pressed and/or jammed, directly and/or indirectly, between the first gearing element and the section of the housing element. On account of this, stability can in particular be improved.

Possibly the housing unit could comprise only the housing element and be in particular free of further housing elements. The housing element could in particular support the first gearing element and the second gearing element. Alternatively, the housing unit comprises at least one further housing element which supports at least the second gearing element. As a result of this, a high level of stability can in particular be achieved.

Furthermore, it is proposed that the housing element may at least mostly encompasses the further housing element. On account of this, stability can in particular be increased.

In addition, it is proposed that the housing element and the further housing element may be latched with each other. As a result of this, a fast and/or easy assembly procedure can in particular be achieved. In particular, a movement of the housing element and of the further housing element with respect to each other can be prevented, as a result of which stability can in particular be improved.

For example the second gearing element could be located directly contacting the first gearing element and the section of the housing element. Preferably at least one section of the further housing element is at least mostly arranged between the second gearing element and at least one section of the housing element. There may exist in particular a line of force between the first gearing element, the second gearing element, the section of the further housing element and the section of the housing element. On account of this, a compact implementation can in particular be provided.

Possibly the second gearing element could be latched with the further housing element in a pre-assembled state. The second gearing element could also be loosely arranged inside the further housing element in a pre-assembled state. The second gearing element can in particular be moved with respect to the further housing element in an easy manner in the pre-assembled state. As a result of this, a fast and/or easy mounting procedure can in particular be achieved, thus saving manufacturing costs and/or manufacturing time. In particular, there is no need to use any additional fixing component for an assembly process.

Further, it is proposed that the housing element may at least be substantially U-shaped and may have at least two legs. In this context, "at least substantially U-shaped" is to mean U-shaped in the technical sense, meaning in particular that rounding errors and/or manufacturing tolerances are considered. On account of this, the housing element can in particular be manufactured in an easy and/or fast manner.

Additionally, it is proposed that the further housing element may be at least substantially U-shaped and may have at least two further legs. As a result of this, the manufacturing process can in particular be accelerated.

In a further implementation of the invention at least one of the legs and at least one of the further legs may be oriented at least substantially perpendicularly with respect to each other. A first one of the legs of a first one of the housing elements may in particular be at least substantially perpendicular to both legs of a second one of the housing elements. In at least one cross-sectional plane the legs of the housing elements may in particular form an at least substantially rectangular shape. On account of this, a compact embodiment and/or a very high level of stability can in particular be provided.

A very simple construction can in particular be achieved by a home appliance, in particular by a home chiller appliance, comprising at least one home appliance device according to the invention.

A fast manufacturing process can in particular be achieved by a method for assembly of a home appliance device, the home appliance device comprising: at least one first gearing element that is rotatable around a first rotation axis; at least one second gearing element that is rotatable around a second rotation axis which is perpendicular to the first rotation axis; and at least one housing unit at least partly covering the first gearing element and having at least one housing element and at least one further housing element, the second gearing element being at least mostly arranged inside the further housing element and forming a pre-assembly group together with the further housing element, the pre-assembly group and the first gearing element being at least mostly arranged inside the housing element and latched with the housing element.

Herein the home appliance device is not to be limited to the application and implementation described above. In particular, for the purpose of fulfilling a functionality herein described, the home appliance device may comprise a number of respective elements, structural components and units that differs from the number mentioned herein. Furthermore, regarding the value ranges mentioned in this disclosure, values within the limits mentioned are to be understood to be also disclosed and to be used as applicable.

Further advantages may become apparent from the following description of the drawing. In the drawing an exemplary embodiment of the invention is shown. The drawing, the description and the claims contain a plurality of features in combination. The person having ordinary skill in the art will purposefully also consider the features separately and will find further expedient combinations.

If there is more than one specimen of a certain object, only one of these is given a reference numeral in the figures and in the description. The description of this specimen may be correspondingly transferred to the other specimens of the object.

DETAILED DESCRIPTION OF THE INVENTION

Figure 1:
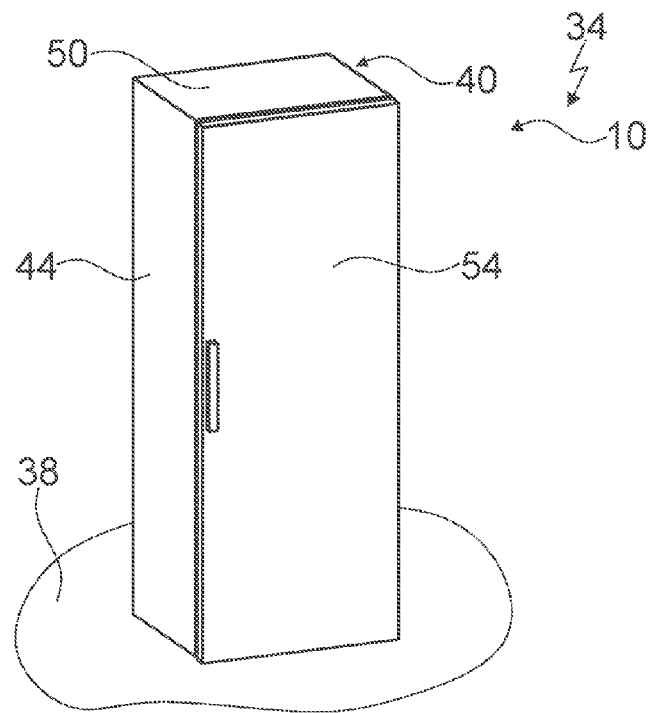
FIG. 1 a home appliance comprising a home appliance device in an operating state, in a schematic front view, FIG. 2 the home appliance comprising the home appliance device in an opened state, in a schematic front view, FIG. 3 a first gearing element, a second gearing element and a housing unit of the home appliance device, in a schematic exploded view, FIG. 4 the first gearing element, the second gearing element and the housing unit in a mounted state, in a schematic view, and FIG. 5 the first gearing element, the second gearing element, the housing unit and an appliance body of the home appliance device in a mounted state, in a schematic view.
Figure 2:
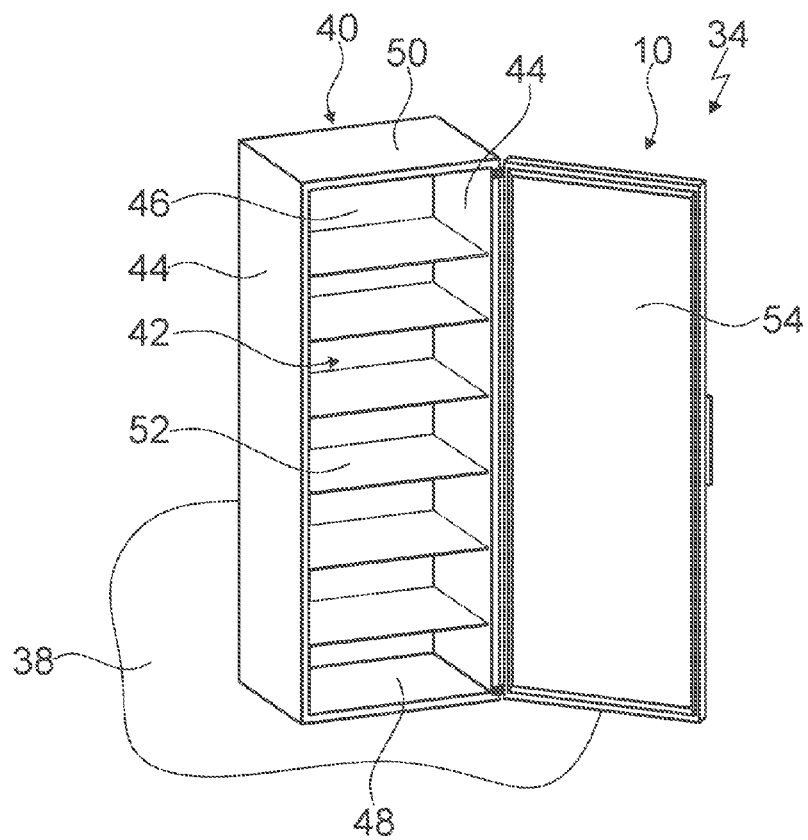

FIG. 1 shows a home appliance 34 comprising a home appliance device 10, in a schematic perspective view. The home appliance 34 is embodied as a home chiller appliance. The home appliance device 10 is embodied as a home chiller appliance device.

In present embodiment the home appliance 34 is embodied as a refrigerator. The home appliance 34 could further be embodied in particular as a wine cooler, a climate cabinet, an ice-box, a freezer and/or a refrigerator-freezer combination.

In FIG. 1 the home appliance device 10 is shown in an installation position. The home appliance device 10 is installed on a base 38. The base 38 defines a substantially horizontal plane.

The home appliance device 10 comprises an appliance body 40. The appliance body 40 partly defines an appliance housing. The appliance body 40 is installed on the base 38 substantially upright.

The appliance body 40 partly defines a storage space 42. The appliance body 40 comprises walls 44, 46, 48, 50. The walls 44, 46, 48, 50 delimit the storage space 42. The appliance body 40 comprises two lateral walls 44, preferably opposite each other. The appliance body 40 comprises a rear wall 46. The appliance body 40 comprises a bottom wall 48. The appliance body 40 comprises a top wall 50, preferably opposite the bottom wall 48.

The home appliance device 10 comprises at least one insert 52. In the present case the home appliance device 10 comprises six inserts 52. It is conceivable that the home appliance device 10 may comprise a differing number of inserts 52 as is deemed advantageous by someone skilled in the art. The home appliance device 10 may preferably comprise a combination of different embodiments of inserts 52, for example at least one insert 52 embodied as a shelf and at least one further insert 52 embodied as a bottle holder. For the sake of clarity, in the following only one insert 52 is given a reference numeral and is described in detail. The following description may be transferred to further inserts 52 accordingly.

The home appliance device 10 comprises at least one appliance door 54. In the present case the home appliance device 10 comprises an appliance door 54. The appliance door 54 is connected to the appliance body 40. In a mounted state, the appliance door 54 is rotatably connected to the appliance body 40.

Figure 3:
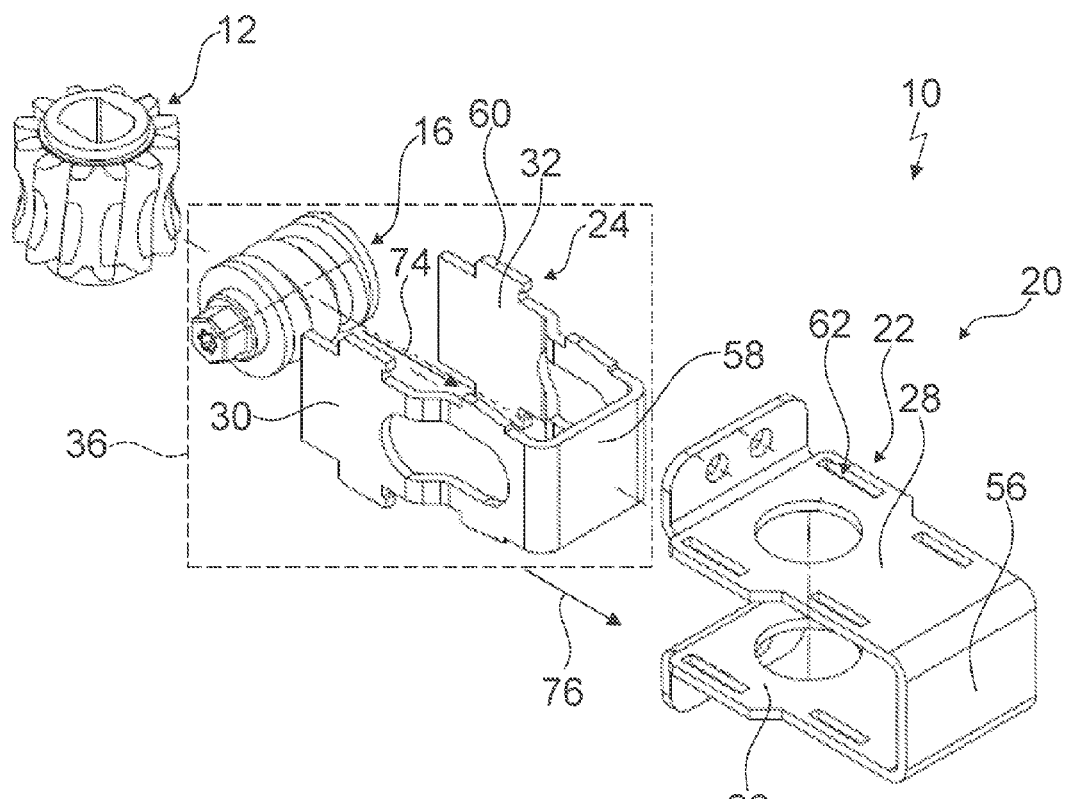
Figure 4:
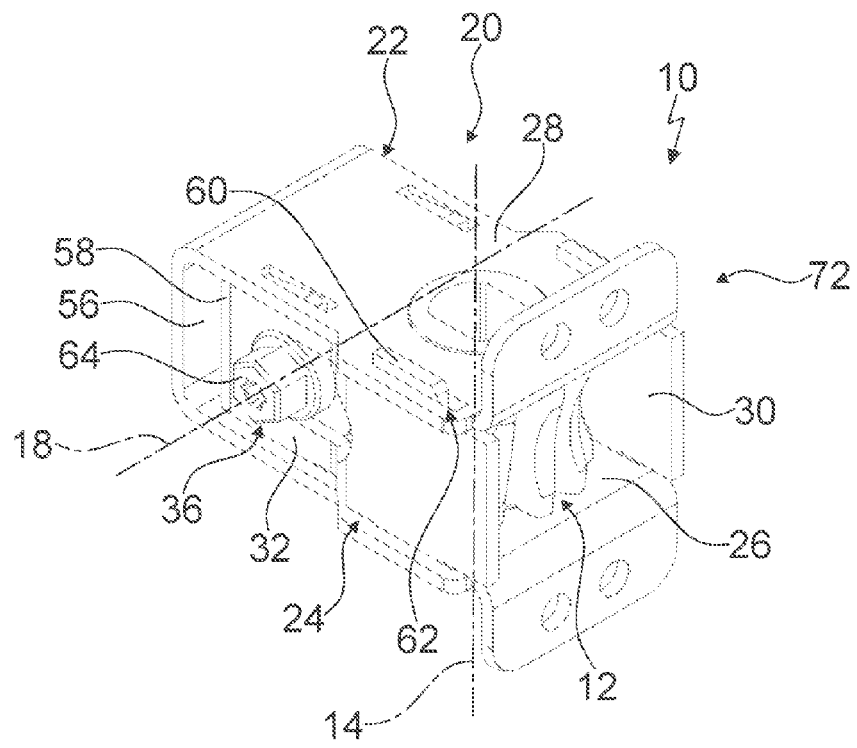
Figure 5:
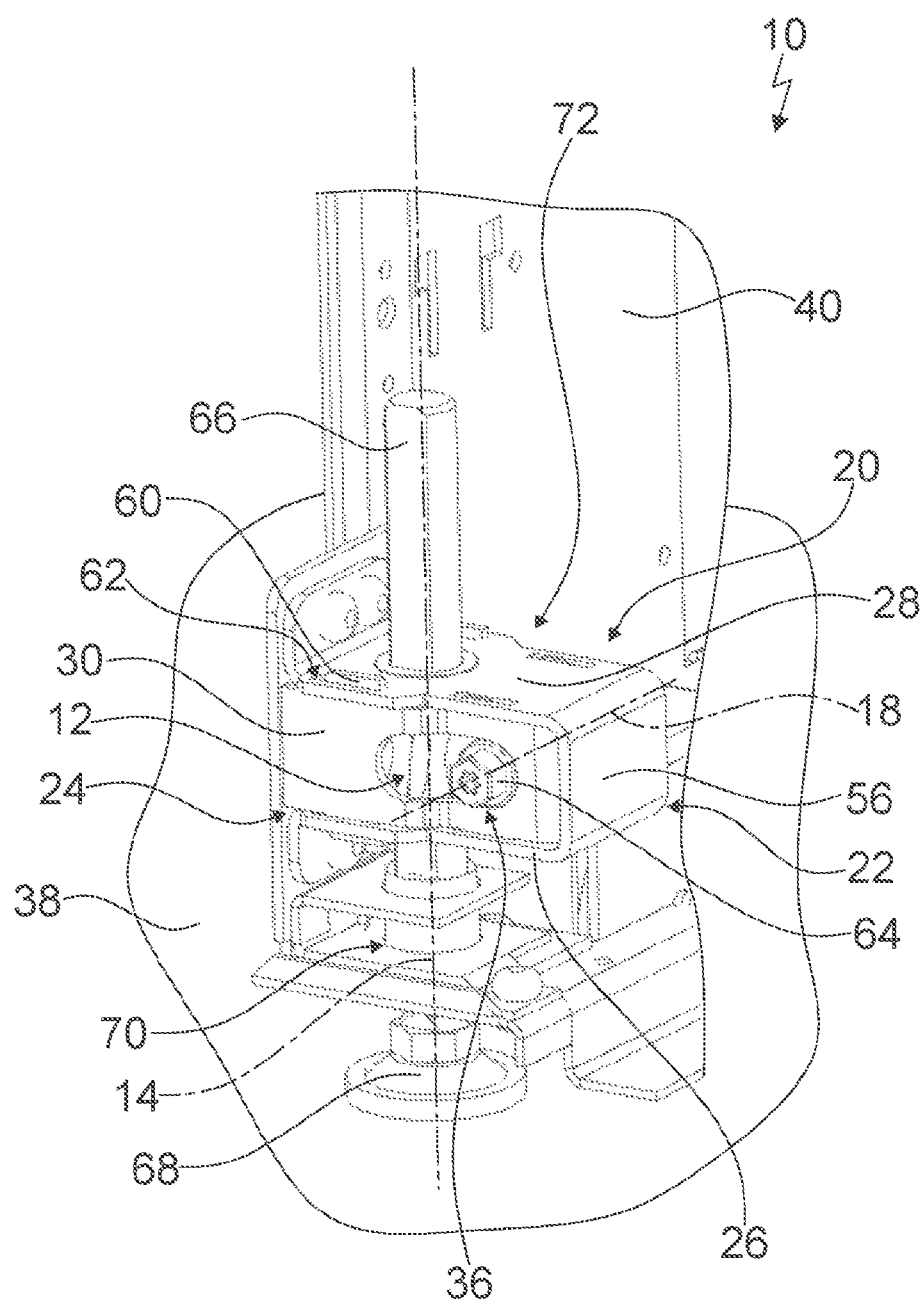

The home appliance device 10 comprises one first gearing element 12 (cf. FIGS. 3 to 5). The first gearing element 12 is rotatable around a first rotation axis 14. In present embodiment the first rotation axis 14 is substantially vertical. The first rotation axis 14 is substantially perpendicular to the base 38. In a mounted state, the first gearing element 12 engages a second gearing element 16 of the home appliance device 10.

The home appliance device 10 comprises the second gearing element 16 (compare FIGS. 3 to 5). The second gearing element 16 is rotatable around a second rotation axis 18. In the present embodiment the second rotation axis 18 is substantially horizontal. The second rotation axis 18 is substantially parallel to the base 38. The second rotation axis 18 is perpendicular to the first rotation axis 14.

The home appliance device 10 comprises a housing unit 20. The housing unit 20 mostly covers the first gearing element 12. In a mounted state, the housing unit 20 mostly covers the second gearing element 16.

The housing unit 20 comprises a housing element 22. The housing element 22 mostly covers the first gearing element 12. In a mounted state, the housing element 22 is latched with the first gearing element 12.

The housing element 22 supports the first gearing element 12. The housing element 22 has two legs 26, 28. The legs 26, 28 are arranged opposite each other. In a mounted state, the first gearing element 12 is supported by means of the legs 26, 28.

The housing element 22 is substantially U-shaped. The housing element 22 has a section 56. The section 56 connects the legs 26, 28 to each other. The section 56 forms the bottom of the U-shape of the housing element 22.

The housing element 22 mostly encompasses the first gearing element 12. The housing element 22 mostly encompasses the second gearing element 16. In a mounted state, the second gearing element 16 is mostly arranged between the first gearing element 12 and the section 56 of the housing element 22.

The first gearing element 12 fixes the second gearing element 16 in position. The second gearing element 16 is mostly indirectly clamped between the first gearing element 12 and the section 56 of the housing element 22. In a mounted state, the second gearing element 16 is mostly directly clamped between the first gearing element 12 and a section 58 of a further housing element 24 of the housing unit 20.

The housing unit 20 comprises the further housing element 24. The further housing element 24 comprises the further section 58. In a mounted state, the further housing element 24 is mostly arranged inside the housing element 22. The housing element 22 mostly encompasses the further housing element 24.

In a mounted state, the further section 58 of the further housing element 24 is mostly arranged between the second gearing element 16 and the section 56 of the housing element 22.

The further housing element 24 supports the second gearing element 16. The further housing element 24 has two further legs 30, 32. The further legs 30, 32 are arranged opposite to each other. In a mounted state, the second gearing element 16 is supported by means of the further legs 30, 32.

The further housing element 24 is substantially U-shaped. The further section 58 connects the further legs 30, 32 to each other. The further section 58 forms the bottom of the U-shape of the further housing element 24.

In a mounted state, the housing element 22 and the further housing element 24 are latched with each other. The further housing element 24 comprises at least one further projection 60. In the present embodiment the further housing element 24 comprises four further projections 60. The further projections 60 are located at the further legs 30, 32 of the further housing element 24.

The housing element 22 comprises at least one recess 62. In present embodiment the housing element 22 comprises four recesses 62. The recesses 62 are located at the legs 26, 28 of the housing element 22. In a mounted state, the further projections 60 of the further housing element 24 engage into the recesses 62 of the housing element 22.

In a mounted state, the U-shape of the housing element 22 and the U-shape of the further housing element 24 are oriented at an angle of substantially 90° with respect to one another. The legs 26, 28 of the housing element 22 and the further legs 30, 32 of the further housing element 24 are oriented substantially perpendicular with respect to each other.

In a pre-assembled state, the further housing element 24 supports the second gearing element 16. The second gearing element 16 is loosely arranged inside the further housing element 24 in a pre-assembled state.

In a method for assembly of the home appliance device 10, the second gearing element 16 is mostly arranged inside the further housing element 24. The second gearing element 16 is inserted into the further housing element 24 in an assembly direction 74. The second gearing element 16 forms a pre-assembly group 36 together with the further housing element 24 (cf. FIG. 3).

The pre-assembly group 36 and the first gearing element 12 are mostly arranged inside the housing element 22. The pre-assembly group 36 and the first gearing element 12 are inserted into the housing element 22 in a further assembly direction 76. The pre-assembly group 36 and the first gearing element 12 are latched with the housing element 22.

The pre-assembly group 36 and the first gearing element 12 and the housing element 22 form a further pre-assembly group 72. The further pre-assembly group 72 may in particular be fixed in position, preferably to the appliance body 40, by means of at least one rivet, for example by means of four rivets.

The first gearing element 12, the second gearing element 16 and the housing unit 20, which in particular comprises the housing element 22 and the further housing element 24, are part of a height adjusting mechanism (cf. FIG. 5). The height adjusting mechanism is provided for adjusting a height of the appliance body 40 with respect to the base 38.

The home appliance device 10 comprises an operating element 64. The operating element 64 is connected to the first gearing element 12 in a torque proof fashion. The operating element 64 is rotatable clockwise and counterclockwise. By rotating the operating element 64 the first gearing element 12 is rotated.

The first gearing element 12 transfers the rotation to the second gearing element 16. The home appliance device 10 comprises a supporting element 66. The supporting element 66 is connected to the second gearing element 16 in a torque proof fashion. By rotating the supporting element 66 the second gearing element 16 is rotated.

The home appliance device 10 comprises a stand element 68. In a mounting position, the stand element 68 is located on the base 38. The stand element 68 and the supporting element 66 are connected to one another.

The home appliance device 10 comprises a gearing 70. The gearing 70 connects the stand element 68 and the supporting element 66 to one another. By rotation of the supporting element 66 a gearing position of the supporting element 66 with respect to the stand element 68 changes. By changing the gearing position of the supporting element 66 with respect to the stand element 68, the height of the appliance body 40 with respect to the base 38 is changed.

The height adjusting mechanism may in particular be configured for the height adjustment of a front floor support stand and/or of a back floor support stand. The housing unit 20, in particular the housing element 22 and/or the further housing element 24, may in particular be made at least mostly of metal and preferably of sheet metal.

The following is a summary list of reference numerals and the corresponding structure used in the above description of the invention:

10 Home appliance device
12 First gearing element
14 First rotation axis
16 Second gearing element
18 Second rotation axis
20 Housing unit
22 Housing element
24 Further housing element
26 Leg
28 Leg
30 Further leg
32 Further leg
34 Home appliance
36 Pre-assembly group
38 Base
40 Appliance body
42 Storage space
44 Wall
46 Wall
48 Wall
50 Wall
52 Insert
54 Appliance door
56 Section
58 Section
60 Further projection
62 Recess
64 Operating element
66 Supporting element
68 Stand element
70 Gearing
72 Further pre-assembly group
74 Assembly direction
76 Further assembly direction

The invention claimed is:

1. A home appliance device comprising:
 at least one first gearing element that is rotatable around a first rotation axis;
 at least one second gearing element that is rotatable around a second rotation axis which is perpendicular to the first rotation axis; and
 at least one housing unit at least mostly covering the first gearing element and having at least one housing element that is latched with the first gearing element;
 wherein the housing unit further comprising at least one further housing element which supports the at least one second gearing element.

2. The home appliance device according to claim 1, the housing element at least mostly encompassing the first gearing element and the second gearing element.

3. The home appliance device according to claim 1, the first gearing element fixing the second gearing element in position.

4. The home appliance device according to claim 1, the second gearing element being at least mostly arranged between the first gearing element and at least one section of the housing element.

5. The home appliance device according to claim 1, the housing element at least mostly encompassing the further housing element.

6. The home appliance device according to claim 1, the housing element and the further housing element being latched with each other.

7. The home appliance device according to claim 1, at least one section of the further housing element being at least mostly arranged between the second gearing element and at least one section of the housing element.

8. The home appliance device according to claim 1, the second gearing element being loosely arranged inside the further housing element in a preassembled state.

9. The home appliance device according to claim 1, the housing element being at least substantially U-shaped and having at least two legs.

10. The home appliance device according to claim 9, the further housing element having at least two further legs, at least one of the legs and at least one of the further legs being oriented at least substantially perpendicular with respect to each other.

11. A home appliance comprising at least one home appliance device according to claim 1.

12. A home appliance device comprising:
- at least one first gearing element that is rotatable around a first rotation axis;
- at least one second gearing element that is rotatable around a second rotation axis which is perpendicular to the first rotation axis; and
- at least one housing unit at least party covering the first gearing element and having at least one housing element, the first gearing element fixing the second gearing element in position; wherein the housing unit comprising at least one further housing element which supports the at least one second gearing element, the housing element and the further housing element being latched with each other.

13. The home appliance device according to claim 12, the second gearing element being at least mostly arranged between the first gearing element and at least one section of the housing element.

14. The home appliance device according to claim 12, the housing element at least mostly encompassing the further housing element.

15. The home appliance device according to claim 12, at least one section of the further housing element being at least mostly arranged between the second gearing element and at least one section of the housing element.

16. The home appliance device according to claim 12, the second gearing element being loosely arranged inside the further housing element in a preassembled state.

17. The home appliance device according to claim 12, the housing element being at least substantially U-shaped and having at least two legs.

18. The home appliance device according to claim 17, the further housing element having at least two further legs, at least one of the legs and at least one of the further legs being oriented at least substantially perpendicular with respect to each other.

19. A home appliance comprising at least one home appliance device according to claim 12.

20. A method for assembly of a home appliance device, the home appliance device comprising:
- at least one first gearing element that is rotatable around a first rotation axis;
- at least one second gearing element that is rotatable around a second rotation axis which is perpendicular to the first rotation axis; and
- at least one housing unit at least partly covering the first gearing element and having at least one housing element and at least one further housing element, the second gearing element being at least mostly arranged inside the further housing element and forming a pre-assembly group together with the further housing element, the pre-assembly group and the first gearing element being at least mostly arranged inside the housing element and latched with the housing element.

* * * * *